US009826229B2

(12) United States Patent
Panusopone et al.

(10) Patent No.: US 9,826,229 B2
(45) Date of Patent: Nov. 21, 2017

(54) SCAN PATTERN DETERMINATION FROM BASE LAYER PIXEL INFORMATION FOR SCALABLE EXTENSION

(71) Applicant: GOOGLE TECHNOLOGY HOLDINGS LLC, Mountain View, CA (US)

(72) Inventors: Krit Panusopone, San Diego, CA (US); Limin Wang, San Diego, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 807 days.

(21) Appl. No.: 14/020,922

(22) Filed: Sep. 9, 2013

(65) Prior Publication Data
US 2014/0092982 A1 Apr. 3, 2014

Related U.S. Application Data

(60) Provisional application No. 61/707,947, filed on Sep. 29, 2012, provisional application No. 61/718,198, filed on Oct. 25, 2012.

(51) Int. Cl.
*H04N 19/129* (2014.01)
*H04N 19/14* (2014.01)
(Continued)

(52) U.S. Cl.
CPC ..... *H04N 19/00775* (2013.01); *H04N 19/129* (2014.11); *H04N 19/14* (2014.11);
(Continued)

(58) Field of Classification Search
CPC ........... H04N 19/00775; H04N 19/129; H04N 19/14; H04N 19/30; H04N 19/187
(Continued)

(56) References Cited

U.S. PATENT DOCUMENTS 5,452,104 A 9/1995 Lee
6,108,383 A 8/2000 Miller et al.
(Continued)

FOREIGN PATENT DOCUMENTS

EP 0836328 A2 4/1998
KR 1020137034638 10/2005
(Continued)

OTHER PUBLICATIONS

Office Action in a related matter. Korean Patent Application No. 10-2013-7034638, dated May 11, 2015.
(Continued)

*Primary Examiner* — William C Vaughn, Jr.
*Assistant Examiner* — Jae N Noh
(74) *Attorney, Agent, or Firm* — Young Basile Hanlon & MacFarlane, P.C.

(57) ABSTRACT

A method determines a first unit of video in a base layer and analyzes a portion of pixels for the first unit of video in the base layer. A scan pattern for a second unit of video in an enhancement layer is determined based on the analyzing of the portion of the pixels in the base layer. The enhancement layer is useable to enhance the base layer. The method then performs a scan of the second unit of video in the selected scan pattern for a transform process in the enhancement layer.

17 Claims, 11 Drawing Sheets

(51) Int. Cl.
*H04N 19/187* (2014.01)
*H04N 19/60* (2014.01)
*H04N 19/176* (2014.01)
*H04N 19/30* (2014.01)

(52) U.S. Cl.
CPC ........... *H04N 19/176* (2014.11); *H04N 19/30* (2014.11); *H04N 19/187* (2014.11)

(58) Field of Classification Search
USPC .................................................. 375/240.18
See application file for complete search history.

(56) References Cited

U.S. PATENT DOCUMENTS

| | | | |
|---|---|---|---|
| 6,243,416 | B1 | 6/2001 | Matsushiro et al. |
| 6,256,423 | B1 | 7/2001 | Krishnamurthy et al. |
| 6,434,197 | B1 | 8/2002 | Wang et al. |
| 6,473,460 | B1 | 10/2002 | Topper |
| 6,532,306 | B1 | 3/2003 | Boon et al. |
| 6,687,304 | B1 | 2/2004 | Peng |
| 7,116,830 | B2 | 10/2006 | Srinivasan |
| 7,218,674 | B2 | 5/2007 | Kuo |
| 7,236,527 | B2 | 6/2007 | Ohira |
| 7,253,831 | B2 | 8/2007 | Gu |
| 7,263,125 | B2 | 8/2007 | Lainema |
| 7,450,642 | B2 | 11/2008 | Youn |
| 7,457,362 | B2 | 11/2008 | Sankaran |
| 8,000,546 | B2 | 8/2011 | Yang et al. |
| 8,208,545 | B2 | 6/2012 | Seo et al. |
| 8,311,111 | B2 | 11/2012 | Xu et al. |
| 8,325,796 | B2 | 12/2012 | Wilkins et al. |
| 8,369,411 | B2 | 2/2013 | Au et al. |
| 8,406,545 | B2 | 3/2013 | Choi et al. |
| 8,526,498 | B2 | 9/2013 | Lim et al. |
| 8,666,181 | B2 | 3/2014 | Venkatapuram et al. |
| 8,711,935 | B2 | 4/2014 | Kim et al. |
| 8,724,702 | B1 | 5/2014 | Bulusu et al. |
| 8,929,440 | B2 | 1/2015 | Nguyen et al. |
| 2005/0265447 | A1 | 12/2005 | Park |
| 2007/0268964 | A1 | 11/2007 | Zhao |
| 2008/0310745 | A1 | 12/2008 | Ye et al. |
| 2009/0046941 | A1* | 2/2009 | Mietens ............... H04N 19/176 382/250 |
| 2009/0196342 | A1 | 8/2009 | Divorra Escoda et al. |
| 2009/0232211 | A1 | 9/2009 | Chen et al. |
| 2010/0086028 | A1 | 4/2010 | Tanizawa et al. |
| 2010/0118945 | A1 | 5/2010 | Wada et al. |
| 2010/0128796 | A1 | 5/2010 | Choudhury |
| 2011/0085599 | A1 | 4/2011 | Jeong et al. |
| 2011/0211636 | A1* | 9/2011 | Yamada ............... H03M 7/4006 375/240.12 |
| 2011/0235706 | A1 | 9/2011 | Demircin et al. |
| 2011/0243229 | A1 | 10/2011 | Kim et al. |
| 2011/0293001 | A1 | 12/2011 | Lim et al. |
| 2012/0014436 | A1 | 1/2012 | Segall et al. |
| 2012/0014437 | A1 | 1/2012 | Segall et al. |
| 2012/0014438 | A1 | 1/2012 | Segall et al. |
| 2012/0014439 | A1 | 1/2012 | Segall et al. |
| 2012/0014440 | A1 | 1/2012 | Segall et al. |
| 2012/0014444 | A1 | 1/2012 | Min et al. |
| 2012/0057630 | A1 | 3/2012 | Saxena et al. |
| 2012/0082233 | A1 | 4/2012 | Sze et al. |
| 2012/0163457 | A1 | 6/2012 | Wahadaniah et al. |
| 2012/0201297 | A1 | 8/2012 | Lim et al. |
| 2012/0263238 | A1* | 10/2012 | Miyoshi ............... H04N 19/176 375/240.16 |
| 2012/0320975 | A1 | 12/2012 | Kim et al. |
| 2012/0320984 | A1 | 12/2012 | Zhou |
| 2013/0003837 | A1 | 1/2013 | Yu et al. |
| 2013/0003857 | A1 | 1/2013 | Yu et al. |
| 2015/0195566 | A1* | 7/2015 | Hinz .................... H04N 19/105 375/240.13 |

FOREIGN PATENT DOCUMENTS

| | | |
|---|---|---|
| WO | WO2002104039 | 12/2002 |
| WO | 2011150805 A1 | 12/2011 |
| WO | WO2012122286 | 9/2012 |

OTHER PUBLICATIONS

Sze et al.; "CE11: Parallelization of HHI_Transform_Coding (Fixed Diagonal Scan from C227)", JCTVC-F129, Jul. 2011.

Wien et al., "H.26L Core Experiment Description for Adaptive Block Transforms", Video Coding Experts Group of ITU-T SG.16; Portland, Oregon; Aug. 2000.

Zheng, et al., Mode Dependent Coefficient Scanning, Joint Collaborative Team on Video Coding (JCT-VC) of ITU-T SG16 WP3 and ISO/IEC JTC1/SC29/WG11 4th Meeting: Daegu, KR, Jan. 20-18, 2011.

Adachi; "CAVLC Cleanup for ABT & Alternate Scan," Joint Collaborative Team on Video Coding, Geneva, Mar. 2011.

Bankoski et al. "Technical Overview of VP8, An Open Source Video Codec for the Web". Dated Jul. 11, 2011.

Bankoski et al. "VP8 Data Format and Decoding Guide" Independent Submission. RFC 6389, Dated Nov. 2011.

Bankoski et al. "VP8 Data Format and Decoding Guide; draft-bankoski-vp8-bitstream-02" Network Working Group. Internet-Draft, May 18, 2011, 288 pp.

Bossen, F., "Common test Conditions and Software Reference Configurations, " Joint Collaborative Team on Video Coding, JCTVC-D600, Jan. 2011.

Davies, Thomas, "Unified scan processing for high efficiency coefficient coding," Joint Collaborative Team on Video Coding, Daegu, Jan. 2011.

Han et al., "Jointly Optimized Spatial Prediction and Block Transform for Video and Image Coding," IEEE Transactions on Image Processing, vol. 21, No. 4 (Apr. 2012).

Han et al., "Toward Jointly Optimal Spatial Prediction and Adaptive Transform in Video/Image Coding," ICASSP 2010 (Dallas, TX, Mar. 14-19, 2010).

Implementors' Guide; Series H: Audiovisual and Multimedia Systems; Coding of moving video: 9 Implementors Guide for H.264: Advanced video coding for generic audiovisual services. H.264. International Telecommunication Union. Version 12. Dated Jul. 30, 2010.

ISR & Written Opinion, RE: Application # PCT/US2012/045075; dated Nov. 15, 2012.

ISR & Written Opinion, RE: Application #PCT/US2012/045048; dated Nov. 15, 2012.

ISR and Written Opinion in related matter PCT/US2013/063722, dated Mar. 19, 2014.

Karczewicz et al., "Modifications to intra blocks coefficient coding with VLC," Joint Collaborative Team on Video Coding, Torino, Jul. 2011.

Kerofsky et al., "Results of Core Experiment on Adaptive Block Transforms (ABT),"Video Coding Experts Group of 14 ITU-T SG. 16; Eibsee, Germany; Jan. 2001.

Mozilla, "Introduction to Video Coding Part 1: Transform Coding", Video Compression Overview, Mar. 2012, 171 pp.

Nguyen et al., "Improved Context Modeling for Coding Quantized Transform Coefficients in Video Compression," 16 Picture Coding Symposium, Dec. 8, 2010.

Overview; VP7 Data Format and Decoder. Version 1.5. On2 Technologies, Inc. Dated Mar. 28, 2005.

Series H: Audiovisual and Multimedia Systems; Infrastructure of audiovisual services—Coding of moving video. H.264. Advanced video coding for generic audiovisual services. International Telecommunication Union. Version 11. Dated Mar. 2009.

Series H: Audiovisual and Multimedia Systems; Infrastructure of audiovisual services—Coding of moving video. H.264. Advanced video coding for generic audiovisual services. International Telecommunication Union. Version 12. Dated Mar. 2010.

Series H: Audiovisual and Multimedia Systems; Infrastructure of audiovisual services—Coding of moving video. H.264. Amendment

(56) References Cited

OTHER PUBLICATIONS

2: New profiles for professional applications. International Telecommunication Union. Dated Apr. 2007.
Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.
Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.
Series H: Audiovisual and Multimedia Systems; Infrastructure of audiovisual services—Coding of moving video; Advanced video coding for generic audiovisual services. H.264. Version 1. International Telecommunication Union. Dated May 2003.
Series H: Audiovisual and Multimedia Systems; Infrastructure of audiovisual services—Coding of moving video; Advanced video coding for generic audiovisual services. H.264. Version 3. International Telecommunication Union. Dated Mar. 2005.
Sole et al., "Non-CE11: Diagonal sub-block scan for HE residual coding," Joint Collaborative Team on Video Coding, Geneva, Mar. 2011.
Sole et al., "Unified scans for the significance map and coefficient level coding in high coding efficiency," Joint Collaborative Team on Video Coding, JCTVCF-288 Geneva, Jul. 8, 2011.
Sole, J., R. Joshi, and M. Karczewicz, "Unified scans for the significance map and coefficient level coding in high coding efficiency", JCTVC-E335, Joint Collaborative Team on Video Coding (JCT-VC) of ITU-T SG16 WP3 and ISO/IEC JTC1/SC29/WG11, Mar. 2011.
Song et al., "Mode dependent coefficient scan for inter blocks," JCTVC-F501, Joint Collaborative Team on Video Coding, Jul. 2011.
Sze et al., "CE11: Summary Report on coefficient scanning and coding," Joint Collaborative Team on Video Coding, Daegu, Jan. 2011.
Sze et al., "Parallelization of HHI_Transform_Coding," Motion Picture Expert Group, Oct. 2010.
VP6 Bitstream & Decoder Specification. Version 1.02. On2 Technologies, Inc. Dated Aug. 17, 2006.
VP6 Bitstream & Decoder Specification. Version 1.03. On2 Technologies, Inc. Dated Oct. 29, 2007.
VP8 Data Format and Decoding Guide. WebM Project. Google On2. Dated: Dec. 1, 2010.
Wiegand T et al.:"WD3: Working Draft 3 of High-Efficiency Video Coding", Mar. 29, 2011, No. JCTVC-E603, Mar. 29, 2011, all pages.
Lee J H et al.: "An Efficient Encoding of DCT Blocks With Block-Adaptive Scanning", IEICE Transactions on Communications, Communications Society, Tokyo, JP, vol. E-77-B, No. 12, Dec. 1, 1994, all pages.
Patent Cooperation Treaty, International Search Report and Written Opinion of the International Searching Authority for International Application No. PCT/US2013/058843, dated Nov. 22, 2013, 11 pages.
Bross, Benjamin et al.: "High Efficiency Video Coding (HEVC) Text Specification draft 8", Document of Joint Collaborative Team on Video Coding (JCT-VC), Document JCTVC-J1003_d7, 10th Meeting: Stockholm, SE, Jul. 11-20, 2012, all pages.

* cited by examiner

| EDGE WITHIN A TU | DERIVED SCAN PATTERN WITH TRANSFORM PROCESS | DERIVED SCAN PATTERN WITH TRANSFORM SKIP PROCESS |
|---|---|---|
| HORIZONTAL — 502 | VERTICAL — 504 | HORIZONTAL — 506 |
| VERTICAL — 508 | HORIZONTAL — 510 | VERTICAL — 512 |
| 516 — DIAGONAL/BOTH/NONE | DIAGONAL — 518 | DIAGONAL — 520 |

FIG. 5

| | P[0,0] | P[0,1] | P[0,2] | P[0,3] | P[0,4] | P[0,5] | P[0,6] | P[0,7] |
|---|---|---|---|---|---|---|---|---|
| | P[1,0] | | | | | | | P[1,7] |
| | P[2,0] | | | | | | | P[2,7] |
| | P[3,0] | | | | | | | P[3,7] |
| | P[4,0] | | | | | | | P[4,7] |
| | P[5,0] | | | | | | | P[5,7] |
| | P[6,0] | | | | | | | P[6,7] |
| | P[7,0] | P[7,1] | P[7,2] | P[7,3] | P[7,4] | P[7,5] | P[7,6] | P[7,7] |

FIG. 7

1. TOP_VERTICAL_EDGE_PEAK = MAX ( ABS(P[0,K]-P[0,K+M]))

2. TOP_VERTICAL_EDGE_LOCATION = HORIZONTAL COORDINATE OF TOP_VERTICAL_EDGE_PEAK

3. BOTTOM_VERTICAL_EDGE_PEAK = MAX ( ABS(P[W-1,k]-P[W-1,k+m]))

4. BOTTOM_VERTICAL-EDGE_LOCATION = HORIZONTAL COORDINATE OF BOTTOM_VERTICAL_EDGE_PEAK

5. LEFT_HORIZONTAL_EDG_PEAK = MAX ( ABS(P [k,0] -P [k+m,0]) )

6. LEFT_HORIZONTAL_EDGE_LOCATION = VERTICAL COORDINATE OF LEFT_HORIZONTAL_EDGE_PEAK

7. RIGHT_HORIZONTAL_EDGE_PEAK = MAX ( ABS(P [k,W-1] -P [k+m,W-1]) )

8. RIGHT_HORIZONTAL_EDGE_LOCATION = VERTICAL COORDINATE OF RIGHT_HORIZONTAL_EDGE_PEAK

9. IF (TOP_VERTICAL_EDGE_PEAK > VERTICAL_EDGE_THRESHOLD) && (BOTTOM_VERTICAL_EDGE_PEAK > VERTICAL_EDGE_THRESHOLD)&& (ABS(TOP_VERTICAL_EDGE_LOCATION-BOTTOM_VERTICAL_EDGE_LOCATION)<(VERTICAL_LOCATION_THRESHOLD )

10. THEN VERTICAL_EDGE = PRESENT

11. IF ( LEFT_HORIZONTAL_EDGE_PEAK > HORIZONTAL_EDGE_ THRESHOLD ) && ( RIGHT_HORIZONTAL_EDGE_PEAK > HORIZONTAL_EDGE THRESHOLD ) && ( ABS(LEFT_HORIZONTAL_EDGE_LOCATION-RIGHT_HORIZONTAL_EDGE_LOCATION)<HORIZONTAL_LOCATION_THRESHOLD )

12. THEN HORIZONTAL_EDGE = PRESENT

FIG. 8

SCAN PATTERN DETERMINATION FROM BASE LAYER PIXEL INFORMATION FOR SCALABLE EXTENSION

CROSS REFERENCE TO RELATED APPLICATIONS

The present disclosure claims priority to U.S. Provisional Applications 61/707,947, filed on Sep. 29, 2012, and 61/718,198, filed on Oct. 25, 2012, which are incorporated herein by reference in their entireties.

BACKGROUND

Video compression systems employ block processing for most of the compression operations. A block is a group of neighboring pixels and may be treated as one coding unit in terms of the compression operations. Theoretically, a larger coding unit is preferred to take advantage of correlation among immediately neighboring pixels. Various video compression standards, e.g., Motion Picture Expert Group ("MPEG")-1, MPEG-2, and MPEG-4, use block sizes of 4×4, 8×8, and 16×16 (referred to as a macroblock).

High efficiency video coding ("HEVC") is a block-based hybrid spatial and temporal predictive coding scheme. HEVC partitions an input picture into square blocks referred to as coding tree units ("CTUs") as shown in FIG. 1. Unlike prior coding standards, the CTU can be as large as 128×128 pixels. Each CTU can be partitioned into smaller square blocks called coding units ("CUs"). FIG. 2 shows an example of a CTU partition of CUs. A CTU 100 is first partitioned into four CUs 102. Each CU 102 may be further split into four smaller CUs 102 that are a quarter of the size of the CU 102. This partitioning process can be repeated based on certain criteria, such as limits to the number of times a CU can be partitioned. As shown, CUs 102-1, 102-3, and 102-4 are a quarter of the size of CTU 100. Further, a CU 102-2 has been split into four CUs 102-5, 102-6, 102-7, and 102-8.

Each CU 102 may include one or more blocks, which may be referred to as prediction units ("PUs"). FIG. 3A shows an example of a CU partition of PUs. The PUs may be used to perform spatial prediction or temporal prediction. A CU can be either spatially or temporally predictively coded. If a CU is coded in intra mode, each PU of the CU can have its own spatial prediction direction. If a CU is coded in inter mode, each PU of the CU can have its own motion vectors and associated reference pictures.

Unlike prior standards where only one transform of 8×8 or 4×4 is applied to a macroblock, a set of block transforms of different sizes may be applied to a CU 102. For example, the CU partition of PUs 202 shown in FIG. 3A may be associated with a set of transform units ("TUs") 204 shown in FIG. 3B. In FIG. 3B, PU 202-1 is partitioned into four TUs 204-5 through 204-8. Also, TUs 204-2, 204-3, and 204-4 are the same size as corresponding PUs 202-2 through 202-4. Each TU 204 can include one or more transform coefficients in most cases but may include none (e.g., all zeros). Transform coefficients of the TU 204 can be quantized into one of a finite number of possible values. After the transform coefficients have been quantized, the quantized transform coefficients can be entropy coded to obtain the final compressed bits that can be sent to a decoder.

Using the above block processing, scalable video coding supports decoders with different capabilities. An encoder generates multiple bitstreams for an input video. One of the output bitstreams, referred to as the base layer, can be decoded by itself, and this bitstream provides the lowest scalability level of the video output. To achieve a higher level of video output, the decoder can process the base-layer bitstream together with other output bitstreams, referred to as enhancement layers. One or more enhancement layers may be added to the base layer to generate higher scalability levels. One example is spatial scalability, where the base layer represents the lowest resolution video and the decoder can generate higher resolution video by combining the base-layer bitstream together with additional enhancement-layer bitstreams. Thus, using additional enhancement-layer bitstreams produces a better quality video output.

SUMMARY

In one embodiment, a method determines a first unit of video in a base layer and analyzes a portion of pixels for the first unit of video in the base layer. A scan pattern for a second unit of video in an enhancement layer is determined based on analyzing the portion of the pixels in the base layer. The enhancement layer is useable to enhance the base layer. The method then performs a scan of the second unit of video in the selected scan pattern for a transform process in the enhancement layer.

The following detailed description and accompanying drawings provide a better understanding of the nature and advantages of particular embodiments.

BRIEF DESCRIPTION OF THE DRAWINGS

FIG. 5 depicts a table showing different scan patterns that the encoder and decoder can use for enhancement layers based on pixel information from the base layer according to one embodiment.

FIG. 7 shows an example of a transform unit in the base layer according to one embodiment.

FIG. 8 depicts pseudocode of one method for determining whether the vertical edge and horizontal edge exist according to one embodiment.

DETAILED DESCRIPTION

Described herein are techniques for a video compression system. In the following description, for purposes of explanation, numerous examples and specific details are set forth in order to provide a thorough understanding of particular embodiments. Particular embodiments as defined by the claims may include some or all of the features in these examples alone or in combination with other features described below and may further include modifications and equivalents of the features and concepts described herein.

Figure 1:
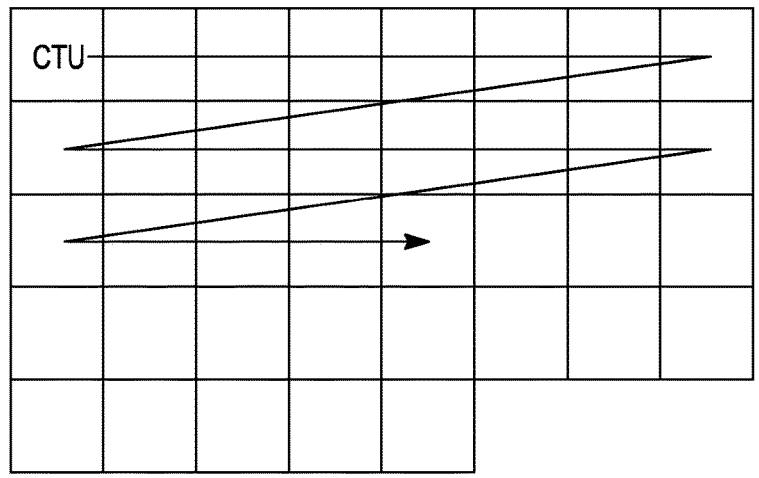
FIG. 1 shows an input picture partitioned into square blocks referred to as coding tree units.
Figure 2:
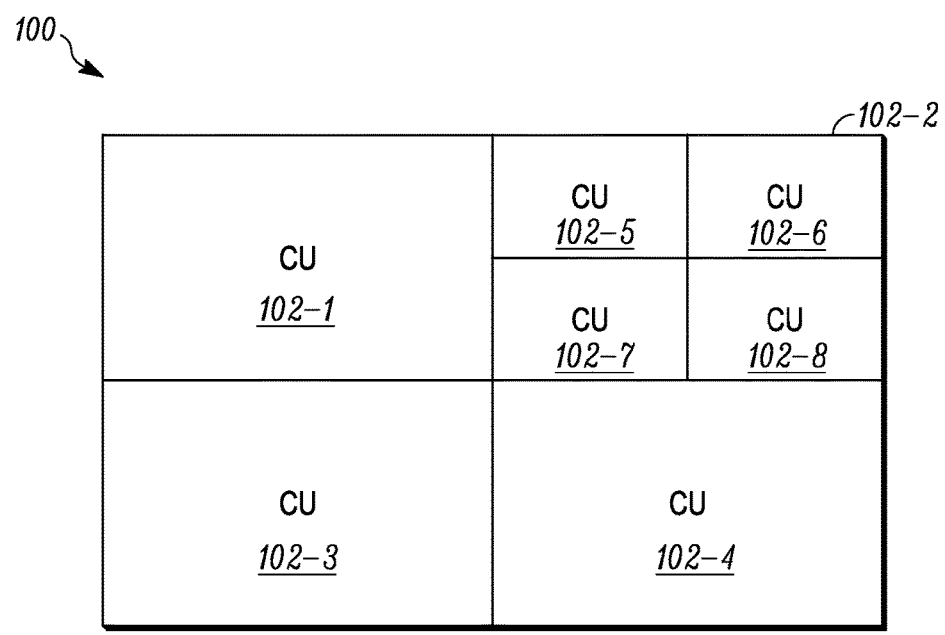
FIG. 2 shows an example of a CTU partition of CUs.
Figure 3A:
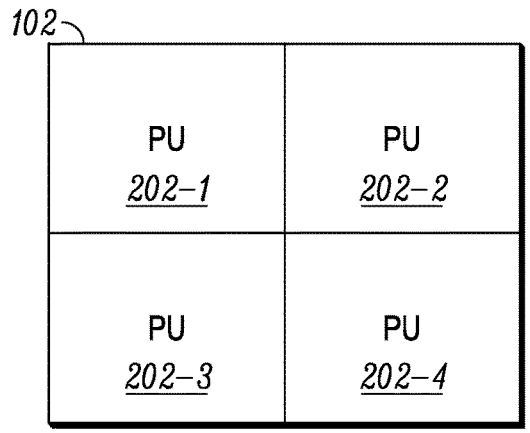
FIG. 3A shows an example of a CU partition of PUs.
Figure 3B:
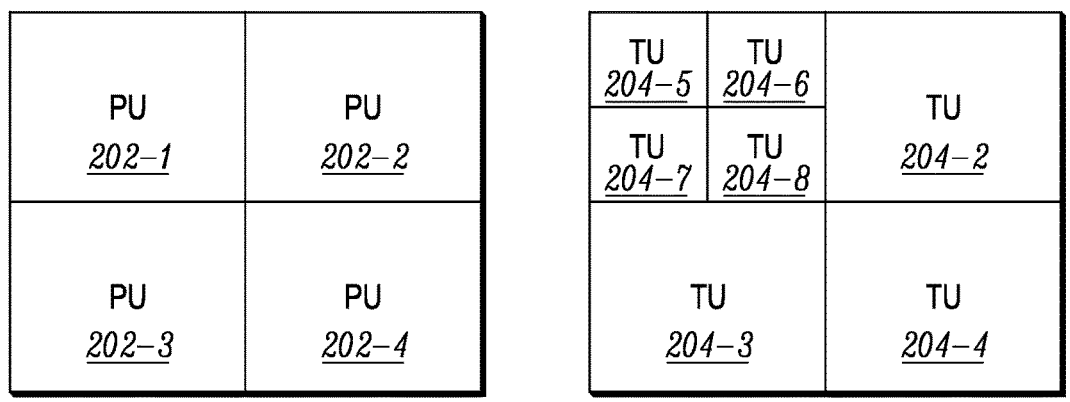
FIG. 3B shows a set of transform units.
Figure 4:
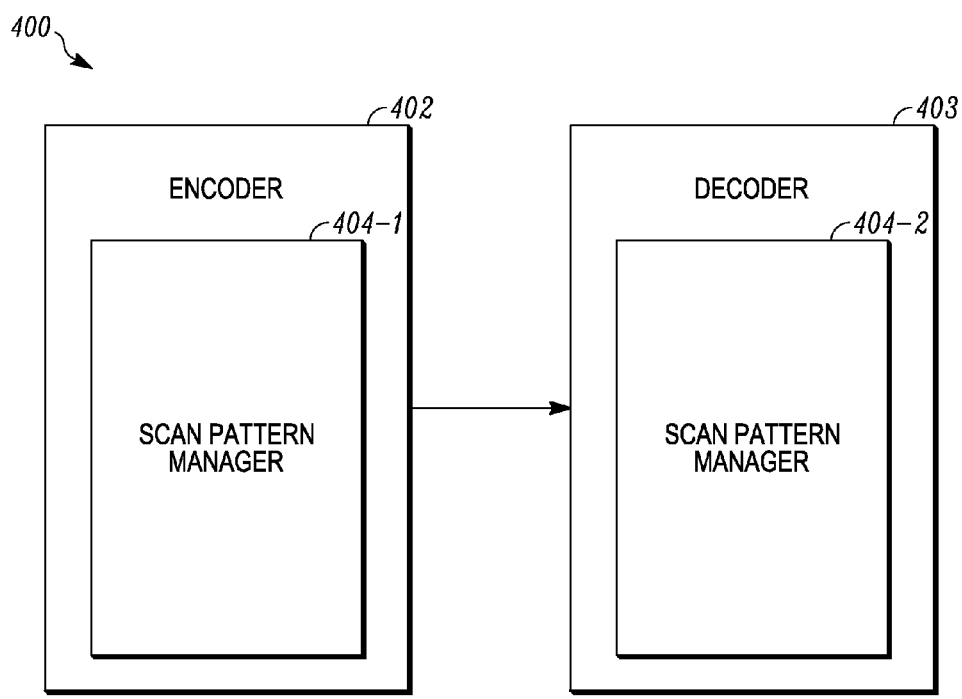
FIG. 4 depicts an example of a system for encoding and decoding video content according to one embodiment.

FIG. 4 depicts an example of a system 400 for encoding and decoding video content according to one embodiment. Encoder 402 and decoder 403 may encode and decode a bitstream using HEVC; however, other video compression standards may also be appreciated.

Encoder 402 includes a scan-pattern manager 404-1, and decoder 403 includes a scan-pattern manager 404-2. Both scan-pattern managers 404-1 and 404-2 may perform similar functions and thus a discussion regarding either scan-pattern manager 404 may apply to the other scan-pattern manager. In particular embodiments, both scan-pattern managers 404-1 and 404-2 determine a scan pattern implicitly. By implicitly determining the scan pattern, encoder 402 and decoder 403 may independently make this determination without any signaling of which scan pattern to use. For example, encoder 402 does not explicitly signal to decoder 403 which scan pattern to use in a transform process. Rather, scan-pattern manager 404-1 and scan manager 404-2 independently determine the same scan pattern to use in a transform process.

Encoder 402 may use scalable video coding to send multiple bitstreams (e.g., a base layer and multiple enhancement layers) to different decoders 403 for an input video. Decoders 403 can then determine which bitstreams to process based on their own capabilities. For example, decoders can pick which quality is desired and process the corresponding bitstreams. For example, each decoder 403 may process the base layer and then can decide how many enhancement-layer bitstreams to combine with the base layer for varying levels of quality.

Encoder 402 encodes the base layer by down sampling the input video and coding the down-sampled version. To encode the base layer, encoder 402 encodes the bitstream with all the information that decoder 403 needs to decode the base layer. An enhancement layer, however, cannot be decoded on its own. To encode an enhancement layer, encoder 402 up samples the down-sampled base layer and then subtracts the up-sampled version from the down-sampled base layer. The difference is then coded for the enhancement layer, which results in a smaller bitstream than the base layer. Encoder 402 may encode any number of enhancement layers by continuing the upsampling.

Encoder 402 and decoder 403 may perform a transform process while encoding/decoding the base layer and the enhancement layers. A transform unit for a prediction unit undergoes a transform process. The transform process decorrelates the pixels within a block and compacts the block energy into low-order coefficients in the transform unit. The transform process may result in a residual prediction unit in the transform domain as a transform calculation is performed. For example, encoder 402 and decoder 403 may perform a discrete cosine transform ("DCT") or a discrete sine transform ("DST") on pixel values in the transform unit. In one embodiment, DCT may be used for any TU, DST can be used only for a 4×4 intra Luma TU, and transform skip is available for the 4×4 TU. The transform process may declare that no transform should be used, which may be referred to as transform skip mode. Conventionally, a flag is transmitted to indicate whether or not transform skip is used.

When performing the transform process, encoder 402 encodes the coefficients of the transform unit in the bitstream based on a scan pattern. Then, decoder 403 decodes the bitstream using the same scan pattern used to encode the bitstream. In one embodiment, encoder 402 and decoder 403 can use three scan patterns, such as diagonal, horizontal, and vertical patterns. Conventionally, in a single layer, the three scan patterns may be used in intra 4×4 and 8×8 transform units. Conventionally, encoder 402 determines the scan pattern based on the intra-prediction direction in the same layer. However, if intra-prediction is not used, encoder 402 signals the scan pattern to decoder 403. The signaling, however, increases overhead as bits are used to signal the scan pattern. In contrast, particular embodiments implicitly determine the scan pattern without signaling which scan pattern is used from encoder 402 to decoder 403. Also, particular embodiments determine the scan pattern based on pixels in the base layer for an enhancement layer. Thus, information from a different layer is used to determine the scan pattern. Also, particular embodiments are flexible in that encoder 402 and decoder 403 determine the scan pattern implicitly even when the base layer TU layer does not use intra prediction.

FIG. 5 depicts a table 500 showing different scan patterns that encoder 402 and decoder 403 can use for enhancement layers based on pixel information from the base layer according to one embodiment. In one embodiment, scan-pattern manager 404, when encoding or decoding an enhancement layer, analyzes the pixel information in the base layer to determine which scan pattern to use with the transform process. In one embodiment, scan-pattern manager 404 detects whether a high frequency component exists in the base layer. One high frequency component is an edge that may occur in the base layer. An edge may be a difference in pixel values between consecutive pixels (or in a group of pixels) that is over a threshold. For example, an edge may be where pixels change in color or on a border of an object. Although edges are described, encoder 402 and decoder 403 may detect other high frequency components.

At 502, the edge that scan-pattern manager 404 detects is horizontal. Based on detecting the horizontal edge, scan-pattern manager 404 may determine a vertical scan pattern shown at 504 for the transform process when encoder 402 and decoder 403 perform a transform calculation, such as using the DCT and DST transforms. Also, scan-pattern manager 404 determines a horizontal scan pattern at 506 when the transform skip process is used (e.g., no transform calculation is performed).

At 508, when scan-pattern manager 404 determines that a vertical edge exists within the TU, scan-pattern manager 404 may determine a horizontal scan pattern at 510 when performing a transform calculation, and the vertical scan pattern at 512 when using the transform skip process.

Also, at 516, when scan-pattern manager 404 determines that there are both horizontal and vertical edges or no horizontal or vertical edges, at 518 and 520, scan-pattern manager 404 may use the diagonal scan pattern when performing a transform calculation and the transform skip process. The goal of adaptive scan is to select a scan pattern that can reach all nonzero (quantized) transform coefficients in a shortest distance. Statistically, a video block that possesses strong horizontal patterns has strong energy along vertical frequency components. Hence, it is more efficient to use vertical scan when a block possesses dominant horizontal edges and utilizes transform process. Similarly, it is more efficient to use horizontal scan when a block possesses dominant vertical edges and utilizes a transform process. Also, when no edges, diagonal edges, or both vertical and horizontal edges exist, it is more efficient to use diagonal scan. The transform skip process may be most efficient when the unit may have no transform coefficients or very few, and a scan pattern with the same direction as dominant edges within the transform unit is more efficient. Although the above scan patterns are selected, scan-pattern manager 404 may select other scan patterns based on the edges detected.

Figure 6:
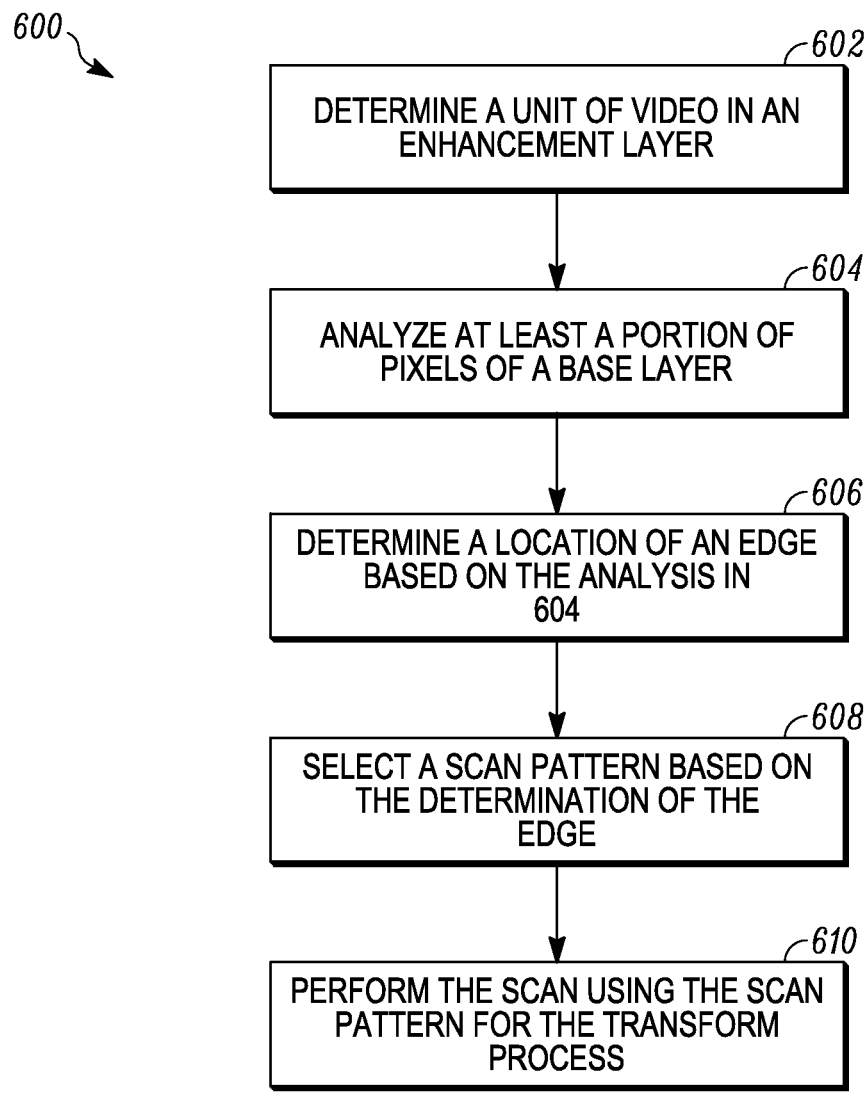
FIG. 6 is a simplified flowchart of a method for selecting the scan pattern according to one embodiment.

FIG. 6 is a simplified flowchart 600 of a method for selecting the scan pattern according to one embodiment. At 602, scan-pattern manager 404 determines a unit of video in an enhancement layer. For example, scan-pattern manager 404 determines a transform unit in a prediction unit of a picture being encoded or decoded.

At 604, scan-pattern manager 404 analyzes at least a portion of the pixels of a base layer. For example, pixel values in a corresponding transform unit (e.g., a transform unit in the same position of the current transform unit) in the base layer are analyzed. In one embodiment, as is discussed in more detail below, pixel values along the boundary of the transform unit (i.e., pixels directly next to a neighboring transform unit) in the base layer are analyzed. Although boundary pixels are described, pixels not along the boundary may be used. This may increase accuracy, but increase overhead.

At 606, scan-pattern manager 404 determines a location of an edge based on the analysis in 604. For example, a horizontal edge, a vertical edge, both a horizontal edge and a vertical edge, or no horizontal edge nor vertical edge is determined.

Then, at 608, scan-pattern manager 404 selects a scan pattern based on the determination of the edge or edges. For example, scan-pattern manager 404 determines the scan pattern based on table 500 shown in FIG. 5. At 610, encoder 402 and decoder 403 then perform the scan using the scan pattern for the transform process.

A method to determine the scan pattern is now described. FIG. 7 shows an example of a transform unit in the base layer according to one embodiment. Boundary pixels are depicted for edge detection. However, it will be understood that pixels other than those found along the boundary may be used for edge detection. Each boundary pixel is depicted by the letter "P" where P[O,x], P[7,x], P[y,O], and P[y,7] are boundary pixels, W is the width of the transform unit, k is an integer between 0 and W−m, where m is a positive integer setting the distance between the two boundary pixels for edge testing purposes, and x and y are pixel coordinates in the horizontal and vertical dimensions, respectively. Although a TU having a size of 8×8 is shown, other sizes may be used.

In one embodiment, pixels in a first row shown at 702 are compared to determine a maximum distance between pixels. For example, scan manager 404 compares pixel P[0,0] to P[0,1] to determine a difference in the pixel values. Subsequently, scan manager 404 compares pixel P[0,1] to pixel P[0,2] to determine the difference in these pixel values. This continues as each consecutive pixel value in the row at 702 is compared. Scan-pattern manager 404 then determines the maximum difference between consecutive pixel values in the row at 702. Although consecutive pixel values are described, the comparison may not be between consecutive pixels (e.g., every other pixel may be compared or groups of pixels may be compared). The maximum difference forms the top vertical edge peak, and scan manager 404 records the location of the peak. Similarly, in a row shown at 704, scan manager 404 compares pixel P[7,0] to pixel P[7,1] to determine the difference in pixel values. Similarly, as described above, scan-pattern manager 404 then continues to compare consecutive pixel values for the entire row at 704. Scan-pattern manager 404 then determines the peak difference between pixel values as the bottom vertical edge peak and records the location of the peak.

A column at 706 is used to determine a left horizontal edge peak. For example, scan manager 404 compares pixel P[0,0] to pixel P[1,0] to determine the difference in pixel values. Then, scan manager 404 compares pixel P[1,0] to pixel P[2,0] to determine another difference in pixel values. This process continues as scan manager 404 determines the difference in pixel values for consecutive pixels in the entire column. Scan-pattern manager 404 then determines the left horizontal edge peak based on the maximum difference determined and records the location of the peak. In a column 708, scan-pattern manager 404 performs the same calculation with the pixel values to determine a right horizontal edge peak and records the location of the peak.

Based on the top vertical edge peak, bottom vertical edge peak, left horizontal edge peak, and right horizontal edge peak, scan-pattern manager 404 may determine if a vertical edge or horizontal edge is found in the transform unit. For example, scan-pattern manager 404 compares the top vertical edge peak and bottom vertical edge peak and the respective locations to thresholds to determine if a vertical edge is present, and scan-pattern manager 404 compares the left horizontal edge peak and the right horizontal edge peak with respective locations to thresholds to determine whether a horizontal edge is present.

Scan-pattern manager 404 may use different methods to determine whether a transform unit includes a horizontal edge or a vertical edge. FIG. 8 depicts pseudocode 800 of one method for determining whether the vertical edge and horizontal edge exist according to one embodiment. In line 1, the variable top_vertical_edge_peak represents the value of the top vertical edge peak. Scan-pattern manager 404 determines the value as a maximum of the absolute value between each pixel value shown in the row at 702. In line 2, the variable top_vertical_edge_location is the horizontal coordinate of the top_vertical_edge_peak.

In line 3, the variable bottom_vertical_edge_peak is the bottom vertical edge peak value in the row shown at 704. Scan-pattern manager 404 determines the bottom vertical edge peak as the maximum of the absolute value for the pixels in the row shown at 704. In line 4, the variable bottom_vertical_edge_location is the horizontal coordinate of bottom_vertical_edge_peak.

In line 5, the variable left_horizontal_edge_peak represents the horizontal edge peak value in the column shown at 706. Scan-pattern manager 404 determines bottom_vertical_edge_peak as the maximum of the absolute value of the pixels in the column shown at 706. In line 6, the variable left_horizontal_edge_location is the vertical coordinate of left_horizontal_edge_peak, which may be the value of k. In line 7, the variable right_horizontal_edge_peak is the value of the horizontal edge peak in the column shown at 708. Scan-pattern manager 404 determines the value of the edge peak based on the maximum of the absolute value of the pixels shown in the column shown at 708. In line 8, the variable right_horizontal_edge_location is the vertical coordinate of right_horizontal_edge_peak.

In line 9, scan-pattern manager 404 tests whether the top vertical edge peak is greater than a threshold vertical_edge_threshold, that the bottom vertical edge peak is greater than a threshold vertical_edge_threshold, and further that the absolute value of the top vertical edge location minus the bottom vertical edge location is less than a threshold vertical_location_threshold. That is, line 9 tests whether both the top vertical edge peak and the bottom vertical edge peak are greater than a certain value that would indicate a large difference in pixel values, which makes this location most likely an edge. Further, line 9 tests whether the top vertical edge location and the bottom vertical edge location are within a certain distance. For example, if the top vertical edge location and the bottom vertical edge location are on different ends of the block, then this may be a diagonal edge. However, if the top vertical edge location and bottom vertical edge location are close to each other, such as if pixel P[0,1] and pixel P[7,2] are the locations, then this more likely is a vertical edge. In this case, at line 10, scan-pattern manager 404 determines that a vertical edge is present by setting the variable vertical_edge to the value of "present."

Scan-pattern manager 404 then determines whether a horizontal edge is present. The above analysis may be used to determine the horizontal edge using the horizontal edge values. For example, if the left horizontal edge peak is located in a pixel P[2,0] and the right horizontal edge peak is located in a pixel P[1,7], and the peak values are above a threshold, then at line 12, scan-pattern manager 404 may determine that a horizontal edge is present.

Accordingly, the vertical edge threshold and horizontal edge threshold are thresholds that scan-pattern manager 404 uses to test whether edge peaks are true edges or not. If edge peaks for either the two horizontal edge peaks or the two vertical edge peaks are greater than the edge threshold, then these two edge peaks are considered true edges. The vertical location threshold and the horizontal location threshold are thresholds that scan-pattern manager 404 uses to determine whether true edges form a horizontal edge, a vertical edge, or other direction edge. If the difference between coordinates is both two edges are smaller than the location threshold, then the two edges form either a horizontal edge or a vertical edge.

In one example, if the variable m is set to 2, then horizontal_edge_threshold and vertical_edge_threshold are both set to 50, and horizontal_location_threshold and vertical_edge_thershold are both set to 1.

Figure 9:
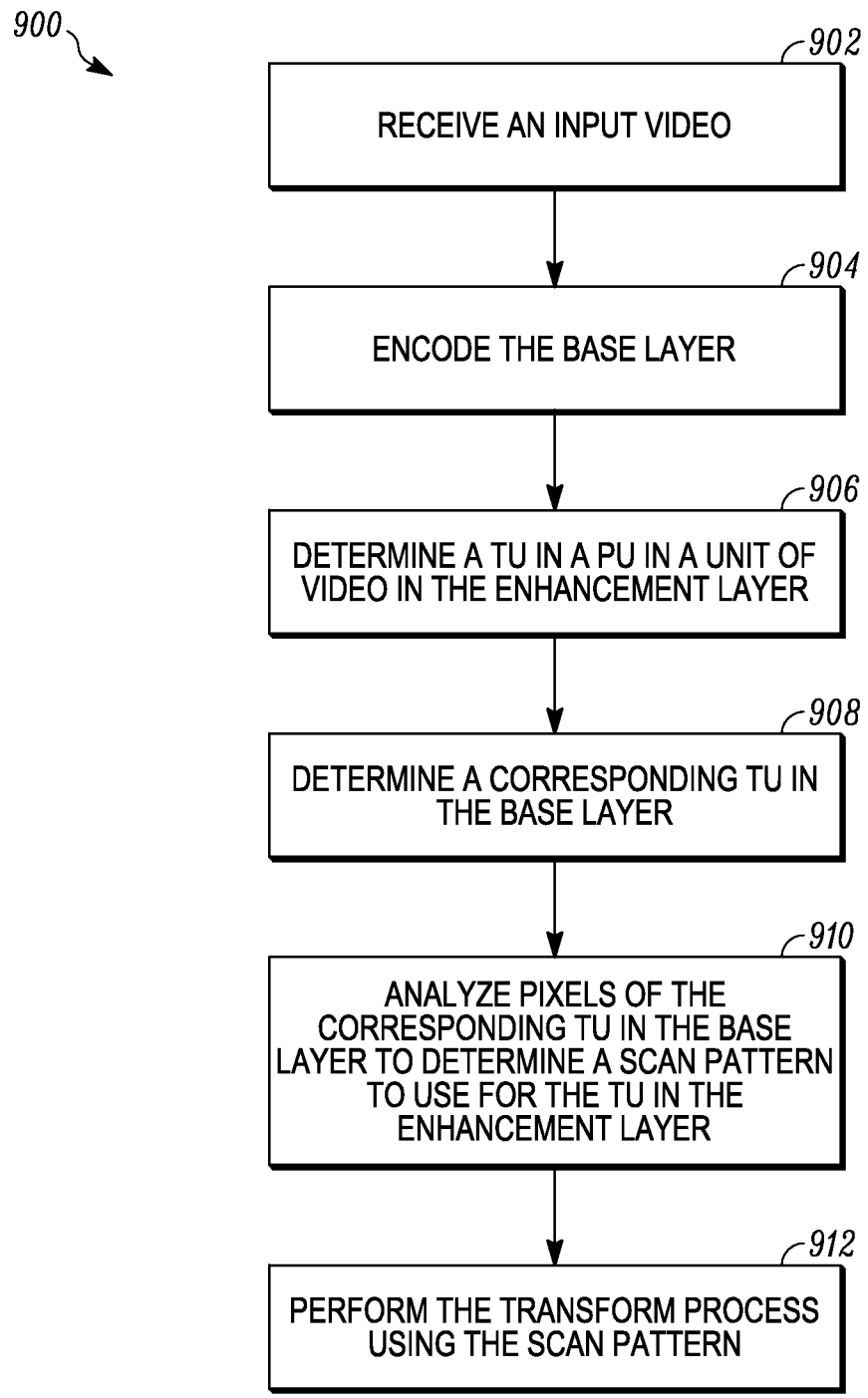
FIG. 9 is a simplified flowchart of a method for encoding video according to one embodiment.

FIG. 9 is a simplified flowchart 900 of a method for encoding video according to one embodiment. At 902, encoder 402 receives an input video. At 904, encoder 402 encodes the base layer. As described above, the input video may be down sampled and encoded into the base-layer bitstream.

Encoder 402 may encode multiple enhancement layers. The following process may be performed for each enhancement layer. At 906, encoder 402 determines a TU in a PU in a unit of video in the enhancement layer. At 908, encoder 402 determines a corresponding TU in the base layer. At 910, encoder 402 analyzes pixels of the corresponding TU in the base layer to determine a scan pattern to use for the TU in the enhancement layer. The scan pattern can be determined as described above. At 912, encoder 402 then performs the transform process using the scan pattern. Encoder 402 then finishes the encoding of the enhancement layers.

Once finishing the encoding of the base layer and the enhancement layers, encoder 402 sends the base layer and the enhancement layers to decoders 403. For example, encoder 402 may use simulcast to send the encoded bitstreams for the base layer and the enhancement layers.

Figure 10:
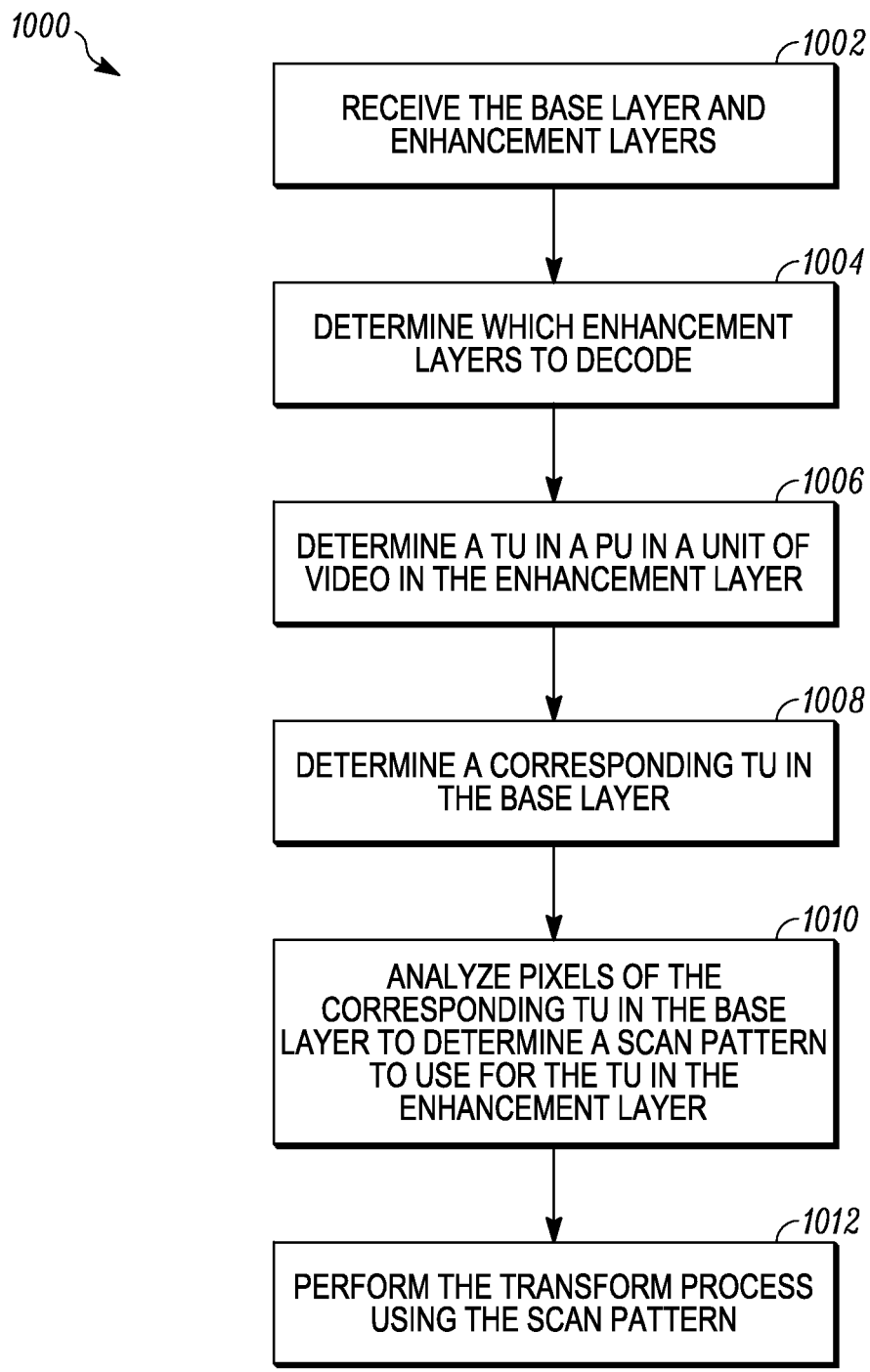
FIG. 10 is a simplified flowchart of a method for decoding video according to one embodiment.

FIG. 10 is a simplified flowchart 1000 of a method for decoding video according to one embodiment. At 1002, decoder 403 receives the base layer and enhancement layers. At 1004, decoder 403 determines which enhancement layers to decode. As described above, based on the decoder's capabilities, different levels of quality may be achieved by using different numbers of enhancement layers.

Decoder 403 may decode one or more enhancement layers. The following process may be performed for each enhancement layer that is decoded. At 1006, decoder 403 determines a TU in a PU in a unit of video in the enhancement layer. At 1008, decoder 403 determines a corresponding TU in the base layer. At 1010, decoder 403 analyzes pixels of the corresponding TU in the base layer to determine a scan pattern to use for the TU in the enhancement layer. The scan pattern can be determined as described above. At 1012, decoder 403 then performs the transform process using the scan pattern. Decoder 403 then finishes the decoding of the enhancement layers and combines the enhancement layers with the base layer. In this case, decoder 403 implicitly determines the scan pattern to use in the enhancement layer based on pixel values from the base layer.

Figure 11A:
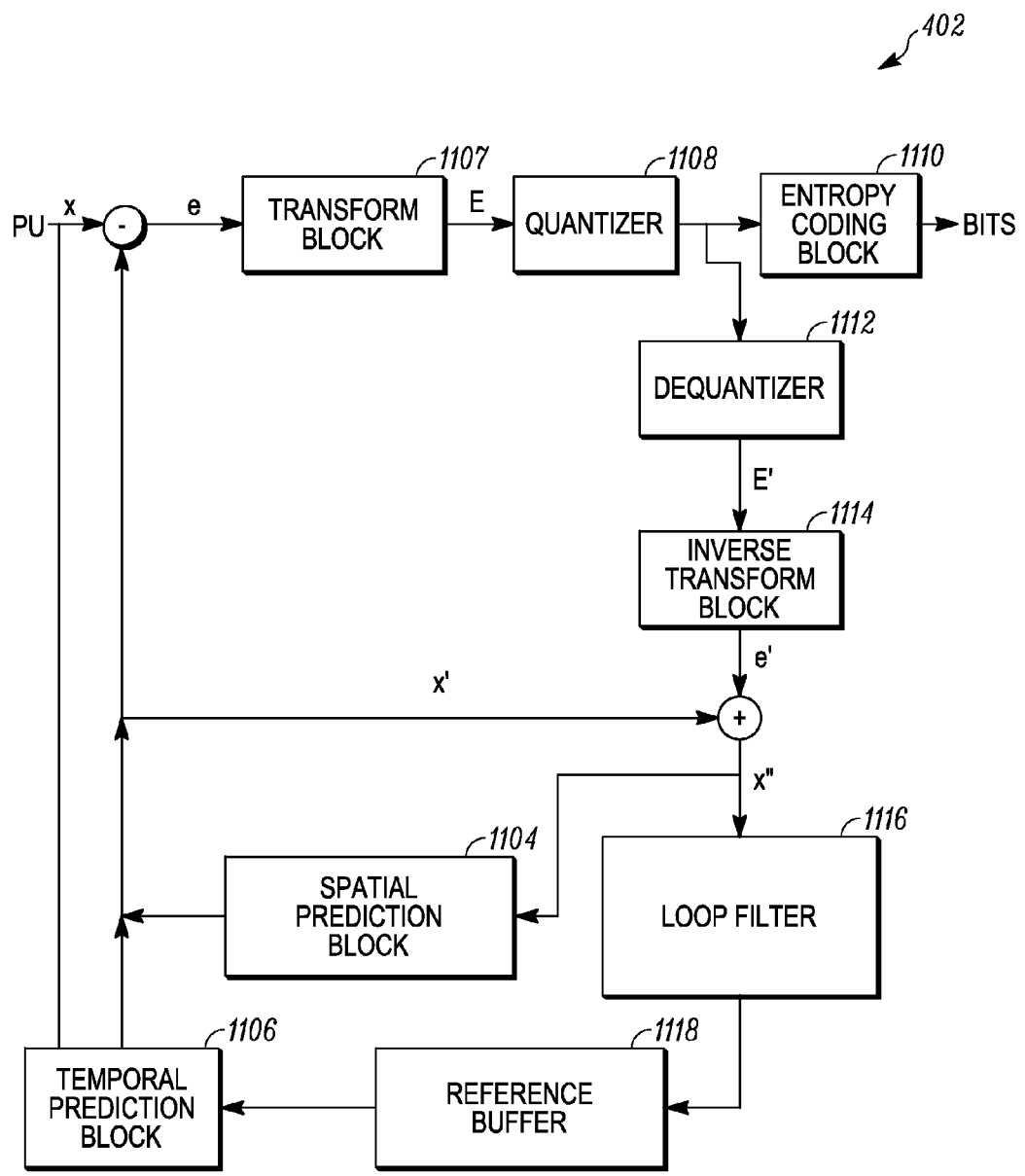
FIG. 11A depicts an encoder according to one embodiment.

In various embodiments, encoder 402 described can be incorporated or otherwise associated with a transcoder or an encoding apparatus at a headend, and decoder 403 can be incorporated or otherwise associated with a downstream device, such as a mobile device, a set-top box, or a transcoder. FIG. 11A depicts an example of encoder 402 according to one embodiment. A general operation of encoder 402 is now described; however, it will be understood that variations on the encoding process described will be appreciated by a person skilled in the art based on the disclosure and teachings herein.

For a current PU, x, a prediction PU, x', is obtained through either spatial prediction or temporal prediction. The prediction PU is then subtracted from the current PU, resulting in a residual PU, e. Spatial prediction relates to intra-mode pictures. Intra-mode coding can use data from the current input image, without referring to other images, to code an I picture. A spatial prediction block 1104 may include different spatial prediction directions per PU, such as horizontal, vertical, 45-degree diagonal, 135-degree diagonal, DC (flat averaging), and planar, or any other direction. The spatial prediction direction for the PU can be coded as a syntax element. In some embodiments, brightness information (Luma) and color information (Chroma) for the PU can be predicted separately. In one embodiment, the number of Luma intra prediction modes for all block size is 35. In alternate embodiments, the number of Luma intra prediction modes for blocks of any size can be 35. An additional mode can be used for the Chroma intra prediction mode. In some embodiments, the Chroma prediction mode can be called "IntraFromLuma."

Temporal prediction block 1106 performs temporal prediction. Inter-mode coding can use data from the current input image and one or more reference images to code "P" pictures or "B" pictures. In some situations or embodiments, inter-mode coding can result in higher compression than intra-mode coding. In inter-mode PUs 204 can be temporally predictive coded, such that each PU 204 of the CU 202 can have one or more motion vectors and one or more associated reference images. Temporal prediction can be performed through a motion estimation operation that searches for a best match prediction for the PU over the associated reference images. The best match prediction can be described by the motion vectors and associated reference images. P pictures use data from the current input image and one or more previous reference images. B pictures use data from the current input image and both previous and subsequent reference images and can have up to two motion vectors. The motion vectors and reference pictures can be coded in the HEVC bitstream. In some embodiments, the motion vectors can be syntax elements "MV," and the reference pictures can be syntax elements "refIdx." In some embodiments, inter mode can allow both spatial and temporal predictive coding. The best match prediction is described by the MV and associated refIdx. The motion vector and associated reference picture index are included in the coded bitstream.

Transform block 1107 performs a transform operation with the residual PU, e. A set of block transforms of different sizes can be performed on a CU, such that some PUs can be divided into smaller TUs, and other PUs can have TUs the same size as the PU. Division of CUs and PUs into TUs can be shown by a quadtree representation. Transform block 1107 outputs the residual PU in a transform domain, E.

A quantizer 1108 then quantizes the transform coefficients of the residual PU, E. Quantizer 1108 converts the transform coefficients into a finite number of possible values. In some embodiments, this is a lossy operation in which data lost by quantization may not be recoverable. After the transform coefficients have been quantized, entropy coding block 1110 entropy encodes the quantized coefficients, which results in final compression bits to be transmitted. Different entropy coding methods may be used, such as context-adaptive variable length coding or context-adaptive binary arithmetic coding.

Also, in a decoding process within encoder 402, a de-quantizer 1112 dequantizes the quantized transform coefficients of the residual PU. De-quantizer 1112 then outputs the de-quantized transform coefficients of the residual PU, E'. An inverse transform block 1114 receives the de-quantized transform coefficients, which are then inverse transformed resulting in a reconstructed residual PU, e'. The reconstructed residual PU, e', is then added to the corresponding prediction PU, x', either spatial or temporal, to form the new reconstructed PU, x". Particular embodiments may be used in determining the prediction. For example, a collocated picture manager may be used in the prediction process to determine the collocated picture to use. A loop filter 1116 performs de-blocking on the reconstructed PU, x", to reduce blocking artifacts. Additionally, loop filter 1116 may perform a sample adaptive offset process after the completion of the de-blocking filter process for the decoded picture, which compensates for a pixel value offset between reconstructed pixels and original pixels. Also, loop filter 1116 may perform adaptive loop filtering over the reconstructed PU, which minimizes coding distortion between the input and output pictures. Additionally, if the reconstructed pictures are reference pictures, the reference pictures are stored in a reference buffer 1118 for future temporal prediction. Intra-mode coded images can be a possible point where decoding can begin without needing additional reconstructed images.

Figure 11B:
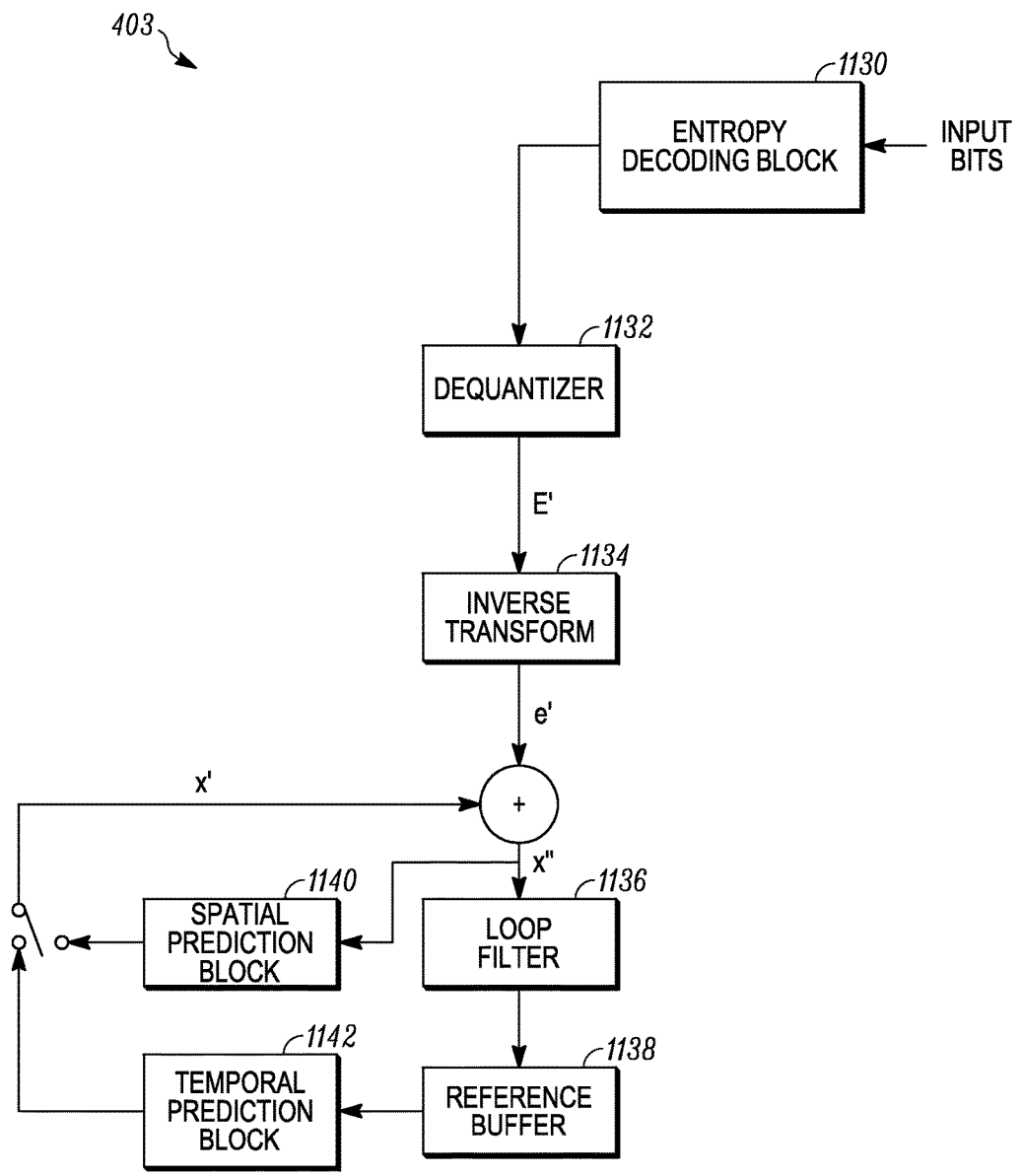
FIG. 11B depicts a decoder according to one embodiment.

FIG. 11B depicts an example of decoder 403 according to one embodiment. A general operation of decoder 403 is now described; however, it will be understood that variations on the decoding process described will be appreciated by a person skilled in the art based on the disclosure and teachings herein. Decoder 403 receives input bits from encoder 402 for encoded video content.

An entropy decoding block 1130 performs entropy decoding on the input bitstream to generate quantized transform coefficients of a residual PU. A de-quantizer 1132 dequantizes the quantized transform coefficients of the residual PU. De-quantizer 1132 then outputs the de-quantized transform coefficients of the residual PU, E'. An inverse transform block 1134 receives the de-quantized transform coefficients, which are then inverse transformed resulting in a reconstructed residual PU, e'.

The reconstructed residual PU, e', is then added to the corresponding prediction PU, x', either spatial or temporal, to form the new reconstructed PU, x". A loop filter 1136 performs de-blocking on the reconstructed PU, x", to reduce blocking artifacts. Additionally, loop filter 1136 may perform a sample adaptive offset process after the completion of the de-blocking filter process for the decoded picture, which compensates for a pixel-value offset between reconstructed pixels and original pixels. Also, loop filter 1136 may perform adaptive loop filtering over the reconstructed PU, which minimizes coding distortion between the input and output pictures. Additionally, if the reconstructed pictures are reference pictures, the reference pictures are stored in a reference buffer 1138 for future temporal prediction.

The prediction PU, x', is obtained through either spatial prediction or temporal prediction. A spatial prediction block 1140 may receive decoded spatial prediction directions per PU, such as horizontal, vertical, 45-degree diagonal, 135-degree diagonal, DC (flat averaging), and planar. The spatial prediction directions are used to determine the prediction PU, x'.

A temporal prediction block 1142 performs temporal prediction through a motion estimation operation. Particular embodiments may be used in determining the prediction. For example, a collocated picture manager may be used in the prediction process to determine the collocated picture to use. A decoded motion vector is used to determine the prediction PU, x\ Interpolation may be used in the motion estimation operation.

The above description illustrates various embodiments along with examples of how aspects of particular embodiments may be implemented. The above examples and embodiments should not be deemed to be the only embodiments and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

We claim:
1. A method comprising:
   determining, by a computing device, a first unit of video in a base layer, wherein the first unit of video comprises a top area, a bottom area, a left area, and a right area, and wherein each area comprises pixels, each pixel having a respective pixel value;
   detecting, by the computing device, an edge in the first unit of video, by:
      determining a top-vertical-edge-peak corresponding to a maximum difference between respective pixel values of consecutive pixels in the top area;
      determining a bottom-vertical-edge-peak corresponding to a maximum difference between respective pixel values of consecutive pixels in the bottom area;
      determining a left-horizontal-edge-peak corresponding to a maximum difference between respective pixel values of consecutive pixels in the left area;
      determining a right-horizontal-edge-peak corresponding to a maximum difference between respective pixel values of consecutive pixels in the right area;
      determining an orientation of the edge by comparing a top-vertical-edge-location in the top area corresponding to the top-vertical-edge-peak with a bottom-vertical-edge-location in the bottom area corresponding to the bottom-vertical-edge-peak, and by comparing a left-horizontal-edge-location in the left area corresponding to the left-horizontal-edge-peak with a right-horizontal-edge-location in the right area corresponding to the right-horizontal-edge-peak;

selecting, by the computing device and based on the orientation of the edge, a scan pattern for a second unit of video in an enhancement layer, wherein the enhancement layer is useable to enhance the base layer; and performing, by the computing device, a scan of the second unit of video in the selected scan pattern for a transform process in the enhancement layer.

2. The method of claim 1 wherein the orientation indicates that the edge is one of:
a horizontal edge,
a vertical edge,
both a horizontal edge and a vertical edge, or
neither a horizontal edge nor a vertical edge.

3. The method of claim 1 wherein different scan patterns are selected based on whether the orientation indicates that the edge is a horizontal edge, a vertical edge, both a horizontal edge and a vertical edge, or neither a horizontal edge nor a vertical edge.

4. The method of claim 1 wherein different scan patterns are selected based on whether the orientation indicates that the edge is a horizontal edge, vertical edge, both a horizontal edge and a vertical edge, or neither a horizontal edge nor a vertical edge, and based on whether a transform calculation is performed or a transform skip process is performed.

5. The method of claim 1,
wherein when the orientation indicates that the edge is a horizontal edge and a transform calculation is performed, a vertical scan pattern is selected,
wherein when the orientation indicates that the edge is a horizontal edge and a transform skip process is performed, a horizontal scan pattern is selected,
wherein when the orientation indicates that the edge is a vertical edge and a transform calculation is performed, a horizontal scan pattern is selected,
wherein when the orientation indicates that the edge is a vertical edge and a transform skip process is performed, a vertical scan pattern is selected,
wherein when the orientation indicates that the edge is both a horizontal edge and a vertical edge or is neither a horizontal edge nor a vertical edge and a transform calculation is performed, a diagonal scan pattern is selected, and
wherein when the orientation indicates that the edge is both a horizontal edge and a vertical edge or is neither a horizontal edge nor a vertical edge and a transform skip process is performed, a diagonal scan pattern is selected.

6. The method of claim 1 wherein the scan pattern is selected from a group of scan patterns including a horizontal scan, a vertical scan, and a diagonal scan.

7. The method of claim 1 wherein an encoder does not signal the selected scan pattern to a decoder.

8. The method of claim 1 further comprising encoding the second unit of video for the enhancement layer using a scan of the second unit of video.

9. The method of claim 1 further comprising decoding the second unit of video for the enhancement layer using a scan of the second unit of video.

10. A decoder comprising:
one or more computer processors; and
a non-transitory computer-readable storage medium comprising instructions that, when executed, control the one or more computer processors to be configured for:
receiving a base layer and one or more enhancement layers from an encoder;
determining a first unit of video in the base layer;
detecting an orientation of an edge in the first unit of video based on respective differences between top boundary pixels, bottom boundary pixels, left boundary pixels, and right boundary pixels for the first unit of video in the base layer, the detecting the orientation of the edge comprising:
determining a top vertical edge peak based on comparing the top boundary pixels for the first unit of video;
determining a bottom vertical edge peak based on comparing the bottom boundary pixels for the first unit of video;
determining a left horizontal edge peak based on comparing the left boundary pixels for the first unit of video;
determining a right horizontal edge peak based on comparing the right boundary pixels for the first unit of video;
detecting the orientation of the edge using the top vertical edge peak, the bottom vertical edge peak, the left horizontal edge peak, and the right horizontal edge peak, the detecting the orientation of the edge comprising:
determining the orientation of the edge indicates a vertical edge when the top vertical edge peak is above a first threshold, the bottom vertical edge peak is above a second threshold, and a location within the top boundary pixels corresponding to the top vertical edge peak and a location within the bottom boundary pixels corresponding to the bottom vertical edge peak are within a third threshold; and
determining the orientation of the edge indicates a horizontal edge when the left horizontal edge peak is above a fourth threshold, the right horizontal edge peak is above a fifth threshold, and a location within the left boundary pixels corresponding to the left vertical edge peak and a location within the right boundary pixels corresponding to the right vertical edge peak are within a sixth threshold;
selecting a scan pattern for a second unit of video in an enhancement layer in the one or more enhancement layers based on the orientation of the edge in the base layer, wherein the enhancement layer is useable to enhance the base layer; and
performing a scan of the second unit of video in the selected scan pattern for a transform process in the enhancement layer.

11. The decoder of claim 10 wherein the edge is a horizontal edge, a vertical edge, both a horizontal edge and a vertical edge, or neither a horizontal edge nor a vertical edge.

12. An encoder comprising:
one or more computer processors; and
a non-transitory computer-readable storage medium comprising instructions that, when executed, control the one or more computer processors to be configured for:
determining a first unit of video in a base layer, the first unit of video comprising adjacent pixels forming a top row, a bottom row, a left column, and a right column;
detecting an orientation of an edge in the first unit of video, by:
detecting a first position, in the top row, based on differences between pixel values of pixels within the top row;

detecting a second position, in the bottom row, based on differences between pixel values of pixels within the bottom row;

detecting a third position, in the left column, based on differences between pixel values of pixels within the left column;

detecting a fourth position, in the right column, based on differences between pixel values of pixels within the right column;

determining that the edge is a vertical edge when the first position is within a first threshold pixel distance of the second position, a difference value corresponding to the first position is above a first threshold, and a difference value corresponding to the second position is above a second threshold; and determining that the edge is a horizontal edge when the third position is within a second threshold pixel distance of the fourth position, a difference value corresponding to the third position is above a third threshold, and a difference value corresponding to the fourth position is above a fourth threshold;

selecting a scan pattern for a second unit of video in an enhancement layer based on the edge, wherein the enhancement layer is useable to enhance the base layer;

performing a scan of the second unit of video in the selected scan pattern for a transform process in the enhancement layer; and encoding the base layer and the enhancement layer.

13. The method of claim 1 wherein determining the orientation of the edge comprises:

determining the orientation of the edge is vertical responsive to the top-vertical-edge-peak being greater than a first threshold, the bottom-vertical-edge-peak being greater than a second threshold, and the top-vertical-edge-location being within a first distance threshold of the bottom-vertical-edge-location; and determining the orientation of the edge is horizontal responsive to the left-horizontal-edge-peak being greater than a third threshold, the right-horizontal-edge-peak being greater than a fourth threshold, and the left-horizontal-edge-location being within a second distance threshold of the right-horizontal-edge-location.

14. The method of claim 1 wherein the top area of the first unit of video comprises a top boundary of the first unit of video, the bottom area of the first unit of video comprises a bottom boundary of the first unit of video, the left area of the first unit of video comprises a left boundary of the first unit of video, and the right area of the first unit of video comprises a right boundary of the first unit of video.

15. The decoder of claim 10 wherein

Determining the top vertical edge peak comprises finding a maximum difference between consecutive pixels of the top boundary pixels, determining the bottom vertical edge peak comprises finding a maximum difference between consecutive pixels in the bottom boundary pixels, determining the left horizontal edge peak comprises finding a maximum difference between consecutive pixels in the left boundary pixels, and determining the right horizontal edge peak comprises finding a maximum difference between consecutive pixels in the right boundary pixels.

16. The decoder of claim 10 wherein the scan pattern comprises one of a horizontal scan, a vertical scan, or a diagonal scan.

17. The encoder of claim 12 wherein selecting the scan pattern further comprises determining whether a transform skip process or a transform calculation is performed on the first unit of video.

\* \* \* \* \*